(12) United States Patent
Liang et al.

(10) Patent No.: US 10,707,948 B2
(45) Date of Patent: Jul. 7, 2020

(54) SYMMETRIC AND FULL DUPLEX RELAY IN WIRELESS SYSTEMS

(71) Applicant: Ping Liang, Newport Coast, CA (US)

(72) Inventors: Ping Liang, Newport Coast, CA (US); Junyang Shen, Irvine, CA (US); Yiming Ma, Xuzhou (CN); Lian Yin Zhang, Vancouver (CA)

(73) Assignee: RF DSP Inc., Irvine, CA (US)

( * ) Notice: Subject to any disclaimer, the term of this patent is extended or adjusted under 35 U.S.C. 154(b) by 70 days.

(21) Appl. No.: 15/537,874

(22) PCT Filed: Jan. 16, 2016

(86) PCT No.: PCT/US2016/013744
§ 371 (c)(1),
(2) Date: Jun. 19, 2017

(87) PCT Pub. No.: WO2016/115547
PCT Pub. Date: Jul. 21, 2016

(65) Prior Publication Data
US 2018/0013483 A1    Jan. 11, 2018

Related U.S. Application Data

(60) Provisional application No. 62/104,091, filed on Jan. 16, 2015.

(51) Int. Cl.
*H04B 7/06*    (2006.01)
*H04B 7/14*    (2006.01)
(Continued)

(52) U.S. Cl.
CPC .............. *H04B 7/14* (2013.01); *H04B 7/0452* (2013.01); *H04B 7/0617* (2013.01);
(Continued)

(58) Field of Classification Search
CPC ...... H04B 7/0452; H04B 7/0617; H04B 7/14; H04B 7/15528; H04L 27/2605; H04L 5/14
(Continued)

(56) References Cited

U.S. PATENT DOCUMENTS 7,123,676 B2    10/2006 Gebara et al.
2004/0095907 A1*    5/2004 Agee .................... H04B 7/0417
370/334

(Continued)

OTHER PUBLICATIONS

Search Report and Written Opinion of the ISA, PCT/US16/13744, WO 2016/115547, dated May 20, 2016.

*Primary Examiner* — Mark H Rinehart
*Assistant Examiner* — Natali Pascual Peguero
(74) *Attorney, Agent, or Firm* — Guosheng Wang; United States Research and Patent Firm

(57) ABSTRACT

This invention presents methods comprising a BS with a plural of antennas capable of beamforming two or more spatial multiplexed streams with two or more antennas on UEs; using one or more of relays to project the capacity of the BS to cover one or more UEs; the BS estimating the uplink channel state information (CSI) between each antenna on the BS and each antenna on the one or more UEs using pilots transmitted from the UE antennas in the presence of the relays which amplifies and forwards the one or more pilots; and, the BS making use of the perseverance of the reciprocity of the over the air channel by the symmetry of the DL and UL paths of the relays to obtain the downlink CSI using the estimated uplink CSI that includes the effect of the relays.

18 Claims, 6 Drawing Sheets

(51) Int. Cl.
    *H04L 27/26*     (2006.01)
    *H04L 5/14*      (2006.01)
    *H04B 7/0452*    (2017.01)
    *H04B 7/155*     (2006.01)

(52) U.S. Cl.
    CPC .......... *H04B 7/15528* (2013.01); *H04L 5/14* (2013.01); *H04L 27/2605* (2013.01)

(58) Field of Classification Search
    USPC .................. 370/278, 280, 315, 334, 400
    See application file for complete search history.

(56) References Cited

U.S. PATENT DOCUMENTS

| | | | |
|---|---|---|---|
| 2005/0226353 A1* | 10/2005 | Gebara | H01Q 1/521 375/346 |
| 2007/0165581 A1* | 7/2007 | Mehta | H04B 7/026 370/338 |
| 2009/0054093 A1* | 2/2009 | Kim | H04B 7/061 455/500 |
| 2009/0316609 A1* | 12/2009 | Singh | H04B 7/2609 370/280 |
| 2012/0201191 A1 | 8/2012 | Seo et al. | |
| 2013/0301487 A1* | 11/2013 | Khandani | H04W 16/14 370/278 |
| 2013/0315133 A1* | 11/2013 | Wang | H04W 40/22 370/315 |
| 2014/0022979 A1* | 1/2014 | Chen | H04B 7/15578 370/315 |
| 2014/0242914 A1 | 8/2014 | Monroe | |

\* cited by examiner (a): DownLink (b): Uplink

SYMMETRIC AND FULL DUPLEX RELAY IN WIRELESS SYSTEMS

This application claims the benefit of U.S. Provisional Application No. 62/104,091 filed on Jan. 16, 2015.

FIELD OF INVENTION

This invention relates generally to novel relays in wireless communications systems, and more particularly, to relays for multiple-input multiple-output (MIMO) wireless systems.

BACKGROUND

With the proliferation of wireless communications applications, the wireless industry is focused on more advanced techniques for higher data throughput to more users in wireless systems. One method to increase spatial re-use of wireless spectrum is Multiple-Input and Multiple-Output (MIMO) antenna systems, especially Multi-User MIMO (MU-MIMO). In a wireless communication system, a wireless node with multiple antennas, be it a Base Station (BS) or a User Equipment (UE), can use beamforming in downlink (DL) or uplink (UL) to increase the Signal-to-Noise Ratio (SNR) or Signal-to-Interference-plus-Noise Ratio (SINR), hence the data rate, of the links with other wireless nodes. MU-MIMO can beamform to multiple UEs simultaneously in a frequency and time block, e.g., a Resource Block (RB), i.e., using spatial multiplexing to provide capacity growth without the need of increasing the bandwidth. A BS may be equipped with a large number of antennas, e.g., many tens to hundreds, to serve many users, referred as massive MIMO systems [1].

A relay that instantly amplifies and forwards an in-band signal (hereafter referred to simply as relay) is an efficient component to increase the SNR of UEs with bad channel condition, and improve channel estimation accuracy. Although a MIMO BS with a large number of antennas can extend its DL coverage range through beamforming, the SINR of UEs can decay quickly as the distance to a UE increases or due to shadowing. Hence, the UEs far away from the BS have significantly lower SINRs than those close to the BS, due to large scale fading, shadowing, among other factors. In addition, the UL range, and hence the UL channel estimation accuracy, is limited by the transmitting power of UEs. With relays, the BS is able to receive the signals with high SNR from the UEs even close to the cell edge.

The channel estimation is a challenging and important issue in multi-user MIMO systems. In order for the BS to beamform to multiple UEs using the plural of antennas, the BS needs to know sufficiently and accurately the DL channels to the UEs, e.g., the DL Channel State Information (CSI) of each UE. However, it is not efficient to obtain the DL CSI directly by sending reference pilots in the DL because of two reasons: (1). The large number of antennas on the BS would cause large system overhead for reference signals in the downlink; (2). Dozens of bits are needed to quantize the CSI accurately, which causes overload of the feedback channel in the UL. Fortunately, the reciprocal property of an over the air wireless channel, such as in a Time-Division Duplexing (TDD) system or in an Frequency-Division Duplexing (FDD) system using switching to create channel reciprocity as described in our PCT application PCT/US14/71752 filed on Dec. 20, 2014, claiming the benefit of provisional patent application 61/919,032 filed on Dec. 20, 2013, can be employed to reduce the channel estimation overhead. In such a system, a UE sends a pilot signal, e.g., Sounding Reference Signal (SRS), that is received by all the antennas on the BS in the UL. The BS estimates the UL CSI through the received pilot signal and uses it to estimate the DL CSI based on channel reciprocity.

One embodiment of this invention is a symmetric relay that will allow efficient channel estimation using wireless channel reciprocity. With relays in the systems, the Total Channels (TCs) between BS and UEs comprise of channels through the relays and the channels without the relays. To efficiently estimate the channel through the UL CSI based on channel reciprocity, the channels through the relays also need to be reciprocal. Only with symmetric design of relays, the TCs in the UL and DL will be the same, and then the UL CSI can be used to estimate the DL TCs. The BS can use the channel estimates of the TCs to compute precoding matrices or detection matrices; and use the precoding or detection matrices to perform beamforming to transmit data to or receive data from multiple UEs using the same frequency resources, whereas MU-BF can use any known or future MU-BF method, e.g., Zero-Forcing (ZF), Regularized ZF (RZF), Conjugate Beamforming (CB), Minimum Mean Square Error (MMSE), Dirty Paper Coding (DPC), etc.

There have been some prior works considering relays in wireless systems. In [2], Boris Rankov and Armin Wittneben described relay-assisted wireless MIMO channels for single-user MIMO (SU-MIMO) where the destination antennas are equally spaced in a linear array, and the relays are limited to single antenna nodes. The relays use time division duplex (TDD), i.e., receive a data packet in one time slot and transmit it in another time slot. This reduces the spectral efficiency and requires synchronization of the relays. In [3] Chae, Chan-Byoung, et al. descried MIMO relaying with linear processing for multiuser transmission in fixed relay networks that is also TDD two-hop communication, same as in [2]. In [4] Wei Xu and Xiaodai Dong described a limited feedback design for MIMO-relay assisted cellular networks with beamforming, in which each UE is required to feed back its quantized CSI to the relay, and the relay sends the quantized beamforming vectors to the BS. In addition, it is limited to the oversimplified case of (Number of antennas of the BS)=(Number of antennas of the relays)=(Number of antennas of the UEs). In [5] Mats Andersson and Bo Goransson proposed a MIMO system with repeaters for beam steering not beamforming, that is, it is limited to steering antenna lobes of repeaters to aim towards a UE, instead of real beamforming at the BS.

None of the prior art contained symmetric relays. This invention described novel symmetric relays designs, which realize the channel reciprocity in UL/DL channels, and consequently enable the efficient channel estimation at the BS using UL pilots for DL beamforming to multi-users.

Another important parameter of a relay is high isolation between transmitting antennas and receiving antennas. Active cancellation may be required in some applications. There was no prior art for efficient amplify and forward relays using active cancellation.

Figure 1:
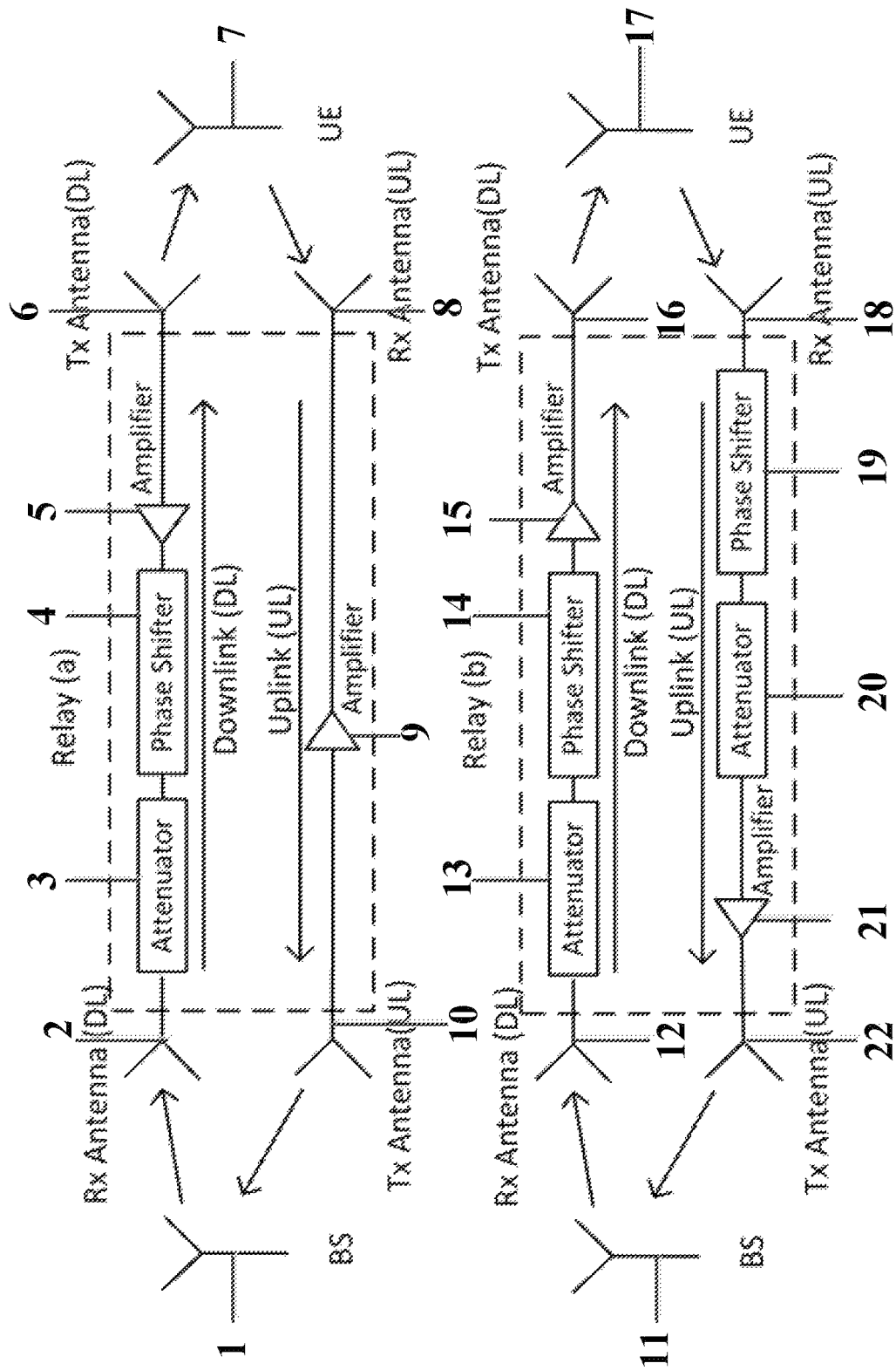
FIG. 1 shows the structure of symmetric relay design with separate DL/UL paths.

Note that only key components are shown in the drawings, other components such as filters, terminators are neglected, but a person skilled in the understands the use of such components.

DETAILED DESCRIPTION

Reference may now be made to the drawings wherein like numerals refer to like parts throughout. Exemplary embodiments of the invention may now be described. The exemplary embodiments are provided to illustrate aspects of the invention and should not be construed as limiting the scope of the invention. When the exemplary embodiments are described with reference to block diagrams or flowcharts, each block may represent a method step or an apparatus element for performing the method step. Depending upon the implementation, the corresponding apparatus element may be configured in hardware, software, firmware or combinations thereof. Here after, a pilot signal may mean a signal transmitted by one antenna for the purpose of estimating the channel between the transmitting antenna and one or more receiving antennas. It may also be called a reference signal, a channel estimation signal or a test signal.

Amplify and Forward Relay Design Using Two Amplifiers

One embodiment of this invention is illustrated in FIG. 1, where the relay achieves symmetry of the UL and DL paths by adjusting attenuators 3 and phase shifters 4. There is an UL circuit which receives signal from one or more UEs 7, amplifies 9 the signal and forwards 10 the signal to a BS 1. For the DL circuit, the relay receives the signal 2 from a BS 1 and sends the amplified signal to one or more UEs. The components (such as amplifier 9) in the UL path may not have exactly the same transfer functions as those in DL, even if they are the same model. Therefore, to maintain the reciprocity/symmetry of the UL/DL links, the embodiment uses adjustable attenuator and phase shifter to calibrate the UL and DL paths of the relay. The attenuator and phase shifter can be on one path (either UL or DL) (Relay (a) in FIG. 1) or on both UL/DL paths (Relay (b) in FIG. 1). In a preferred embodiment, the adjustable phase shifter and/or attenuator are placed on the path prior to the input to the amplifier so that lower power adjustable phase shifter and/or attenuator can be used.

Figure 2:
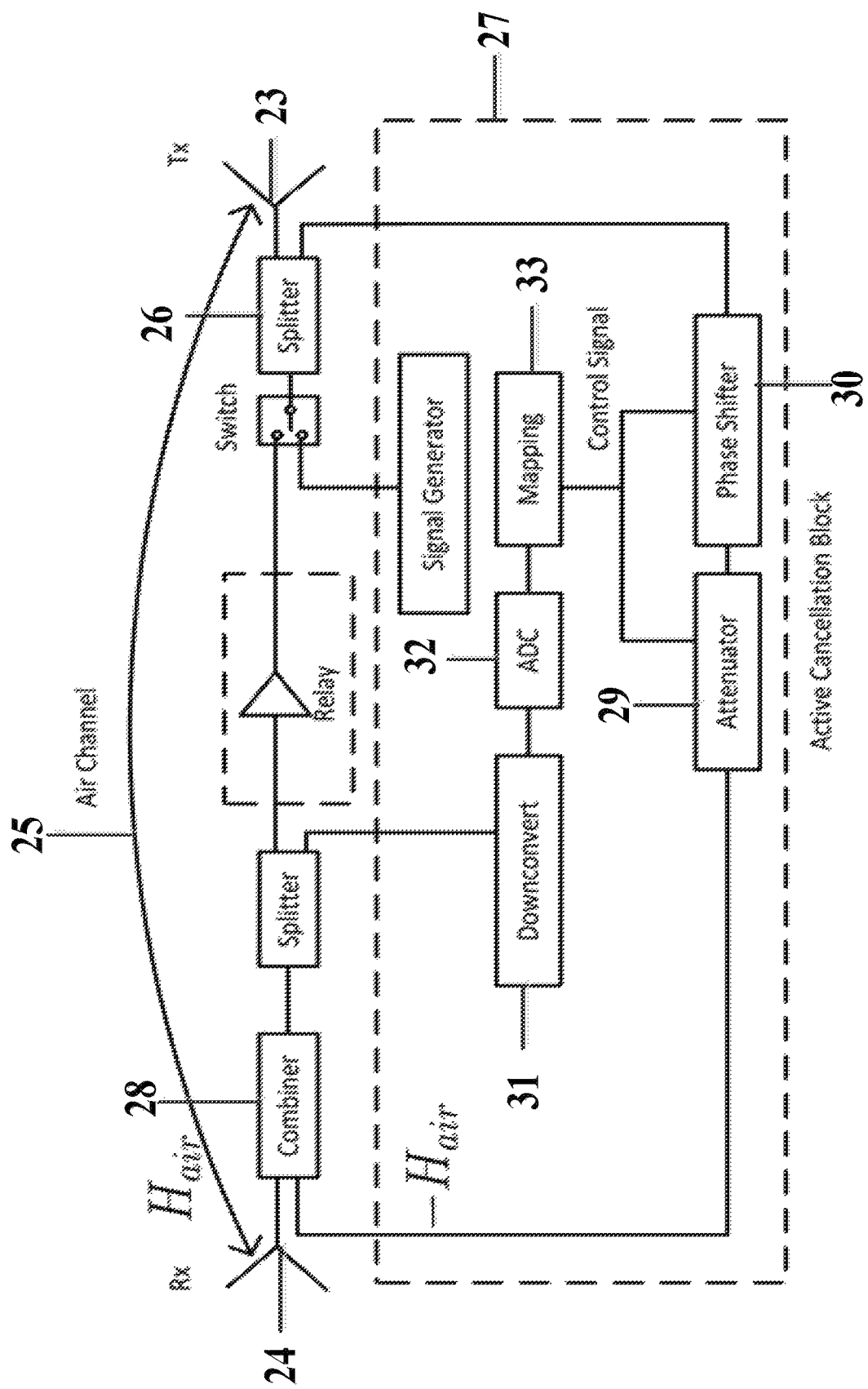
FIG. 2 shows a full duplex relay with active self-interference cancellation block.

High isolation between a Tx antenna and a Rx antenna of a relay is required, where isolation is defined as the attenuation of the Tx signal as seen by the receiving amplifier. This isolation must be higher than the gain of the relay to avoid a positive feedback loop because the relay transmits and receives at the same frequency and same time. The isolation can be increased by using directional or narrow beam Tx and Rx antennas that face different directions, preferably with sufficient angular separation, or by increasing the distance between Tx and Rx antennas. When high gain is required and the isolation is not high enough, one important embodiment of this invention uses active signal cancellation to increase the isolation between the Tx and Rx as shown in FIG. 2. The signal from Tx 23 will be received by Rx 24 through the "Air Channel" 25, even if they are equipped with good directional antennas. Let $H_{air}$ be the channel through the "Air Channel", to effectively cancel $H_{air}$, a part of the transmitted signal is diverted using a coupler or splitter 26, passed through an active cancellation block 27, then combined with the signal received by the Rx antenna using a combiner 28 or coupler. The active cancellation block controls the parameters of the adaptive filter, comprising a attenuator 29 and phase shifter 30 in FIG. 2, to create another channel $H_{cancel} \approx -H_{air}$. At the receiver, the path through the air and the path through the active cancellation block is added such that $H_{air} + H_{cancel} \approx 0$, so that the good isolation between Tx-Rx is achieved. FIG. 2 only shows a single path of attenuator and phase shifter. Other embodiments may use more than one path to construct an adaptive RF filter that can be tuned to generate a cancelation channel $H_{cancel}$ to approximate $H_{air}$. Each path may contain only attenuator or both attenuator and phase shifter. The cancelation circuit can be switched to a calibration mode or an active cancelation mode.

In the calibration mode, a known calibration signal is transmitted from the Tx antenna and received by the Rx antenna. The active cancellation block down-coverts 31 and samples 32 the received signal at Rx. Based on the sampled baseband signals, the active cancellation block obtains an estimate of the over the air channel $H_{air}$. Based on the information of $H_{air}$, the active cancellation performs the mapping 33 from $-H_{air}$ to the settings of the adaptive filter, e.g., the settings of the attenuator and phase shifter in FIG. 2. Then, the attenuator and phase shifter are set accordingly. The mapping could be done by looking up a pre-calibrated table between $H_{air}$ and the filter settings.

Figure 3:
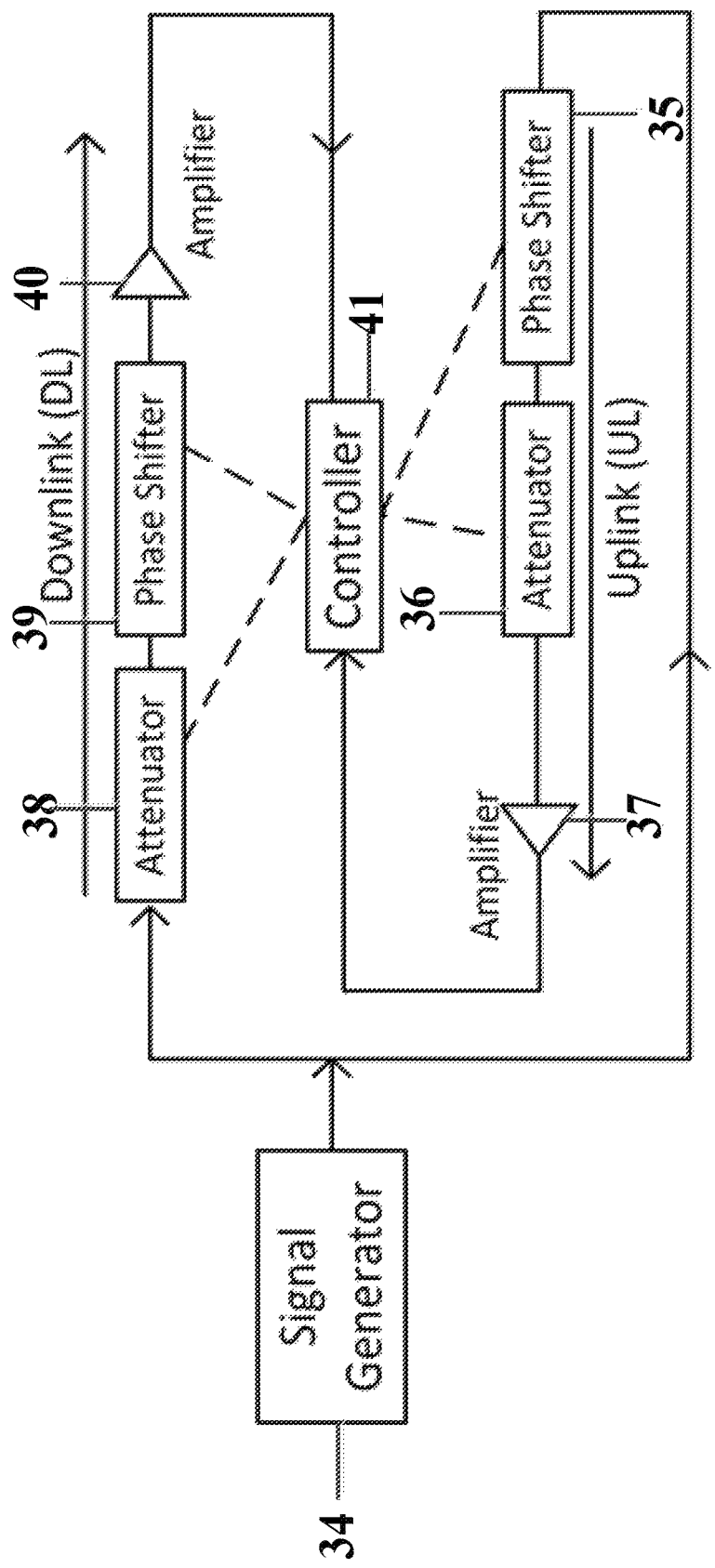
FIG. 3 shows the structure to control the attenuators and phase shifters in relays.

To achieve symmetry of the UL and DL paths of a relay, the settings of the attenuator(s) and phase shifter(s) need to be tuned. In one embodiment, the settings are tuned off-line by injecting a known calibration signal to compute the transfer function of each path, and adjusting the settings to match the transfer functions of the two paths closely. Another embodiment of this invention is a circuit to tune the parameters of the attenuator(s) and phase shifter(s) to match the UL and DL paths inside relays, as shown in FIG. 3. A signal from the "Signal Generator" 34 block passes through both the UL and DL paths of a relay (35-40), and the signals from both paths are received by the "Controller" block 41. The generated signal can be a single tone signal or a signal of a given bandwidth. In the case of a single tone signal, the Signal Generator may sweep through a range of frequencies. The "Controller" block compares the amplitude and phases of the signals through UL and DL paths and generate signals that adjust the parameters of the attenuator(s) and phase shifter(s) to make UL and DL meet the reciprocity/symmetry requirement. In the case of frequency sweeping, the Controller adjust the parameters of the attenuator(s) and phase shifter(s) to make UL and DL best meet the reciprocity/symmetry requirement over the desired bandwidth.

Amplify and Forward Relay Design Using the Same Amplifier

Figure 4:
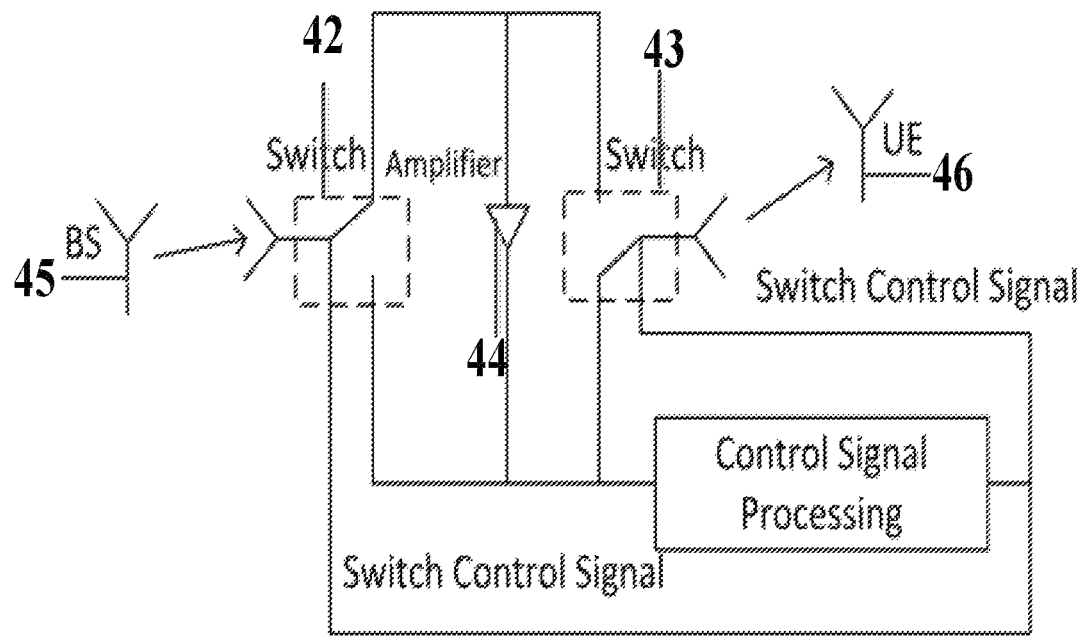
FIG. 4 shows the structure of a symmetric relay using one amplifier.
Figure 4:
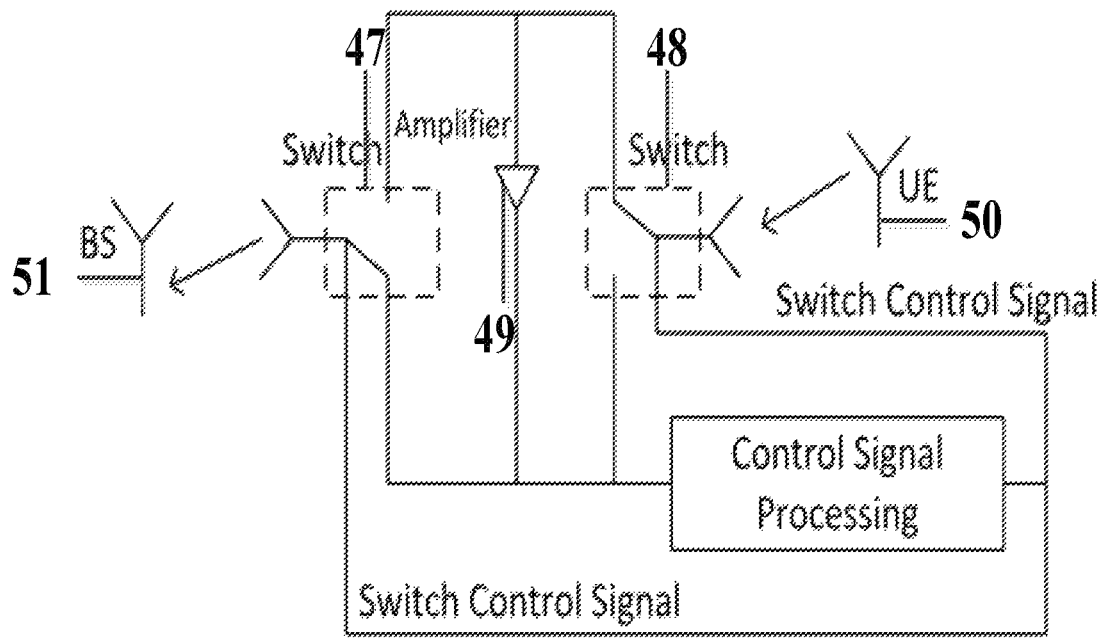

Another embodiment of this invention is a relay for a TDD system that uses the same amplifier in both UL and DL paths, so that the amplifying path is automatically symmetric. As shown in the FIG. 4, there are two switches in the relay to control the input signal of the amplifier. Symmetric traces both in material and geometry and symmetric switches are used to ensure symmetry in the other parts. The mechanism to control the switches for UL/DL is illustrated as follows. As shown in FIG. 4.a, at the DL situation, the two switches (42, 43) are set to receive and amplify 44 signals from a BS 45 and forward it to one or more UEs 46. At the UL situation, the two switches are set to receive and amplify signals from one or more UEs and forward it to a BS. Since the signals in UL and DL go through the same amplifier and the rest of circuit are made with a high degree of symmetry, the UL and DL paths of the relay can be made with a high level of reciprocity.

Figure 5:
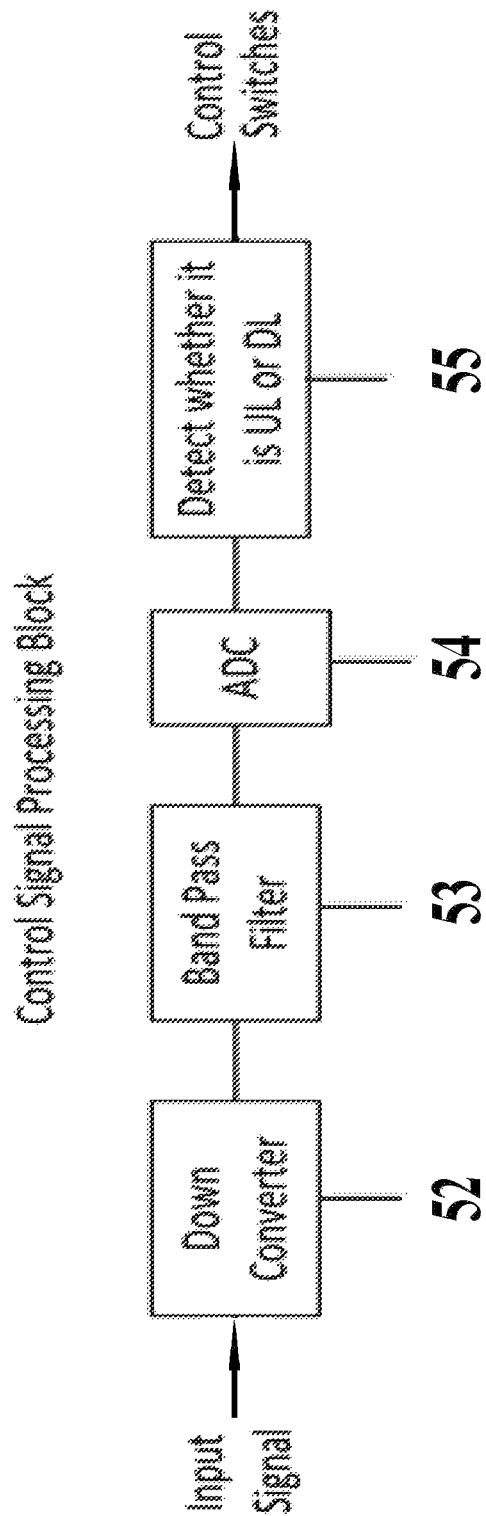
FIG. 5 shows the structure of control signal processing block.

Another embodiment of this invention is the "Control Signal Processing" block to control the positions of the switches based on control signals received by the block from a BS. As shown in FIG. 5, the input signal is first down converted 52, passed through a bandpass filter 53, and Analog-to-Digital-Converter (ADC) 54 sampled. The sampled signals are decoded to decide whether the input signal is for UL or DL 55, and then to control the switches in the relays. In a TDD system, the relay is aware of the protocol, and uses its knowledge of the protocol and received control signals to know whether the upcoming signals in the next time slot are for UL or DL. According to this information, the relays set the switches to make the relay ready for the UL or DL mode. In this way, the UL and DL signals will go through the identical channel through the relays.

Figure 6:
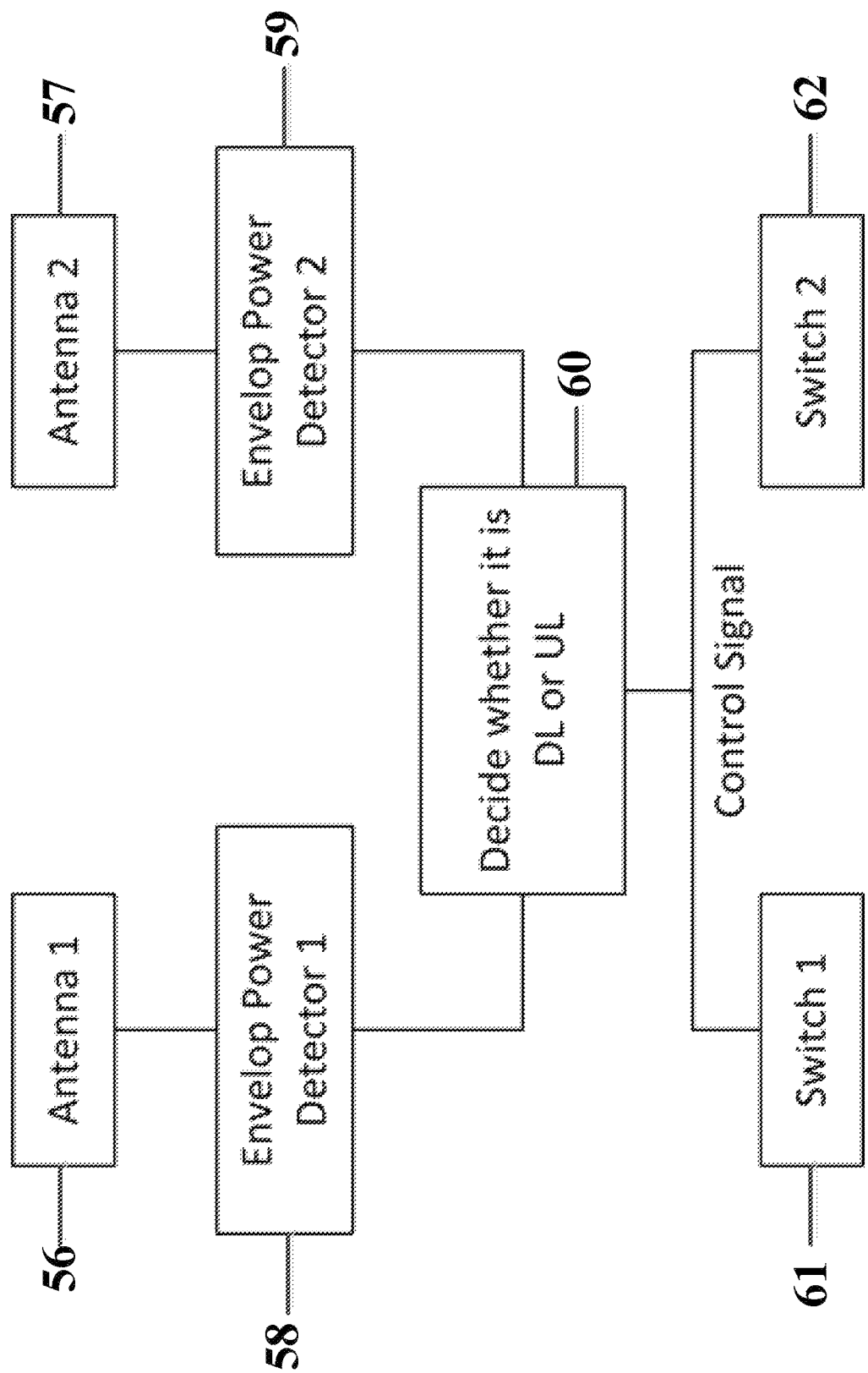
FIG. 6 shows the structure of envelope detector for controlling the UL/DL switching in the symmetric relay shown in FIG. 4.

The "Control Signal Processing" block could also be signal power detection as shown in FIG. 6, so that the signals do not need to be down-converted to baseband. In FIG. 6, antenna 1 56 is a directional or beam antenna that faces a BS and antenna 2 57 is a directional or beam antenna that faces one or more UEs or other relay(s). If power detector 1 58 detects incoming signal with sufficient power, it decides the system is in DL mode 60 and generates the control signal to switch the relay to DL mode 61. Conversely, if power detector 2 59 detects incoming signal with sufficient power, it decides the system is in UL mode 60 and generates the control signal to switch the relay to UL mode 62. The power detection and switching control are completed in a short period of time, e.g., sufficiently shorter than the cyclic prefix in a OFDM signal, thus, allowing DL or UL signals to be successfully amplified and forwarded using a single amplifying path.

Although the foregoing descriptions of the preferred embodiments of the present inventions have shown, described, or illustrated the fundamental novel features or principles of the inventions, it is understood that various omissions, substitutions, and changes in the form of the detail of the methods, elements or apparatuses as illustrated, as well as the uses thereof, may be made by those skilled in the art without departing from the spirit of the present inventions. Hence, the scope of the present inventions should not be limited to the foregoing descriptions. Rather, the principles of the inventions may be applied to a wide range of methods, systems, and apparatuses, to achieve the advantages described herein and to achieve other advantages or to satisfy other objectives as well.

What is claimed is:

1. A method for Multiple Input Multiple Output (MIMO) wireless communication systems comprising
    beamforming two or more spatial multiplexed streams, by a Base Station (BS) with a plural of antennas with two or more antennas on User Equipment (UEs) wherein each UE has a sufficient number of antennas to receive and/or transmit one or more spatial multiplexed streams,
    using one or more relays, whose total number of antennas is sufficient to support the two or more spatial multiplexed streams and whose Downlink (DL) and Uplink (UL) Radio Frequency (RF) circuit paths are symmetric with closely matched transfer functions, to project the capacity of the BS to cover one or more UEs,
    estimating, by the BS, the uplink Channel State Information (C SI) between each antenna on the BS and each antenna on the one or more UEs using pilots transmitted from the UE antennas in the presence of the relays which amplifies and forwards the one or more pilots; and,
    making use of, by the BS, the perseverance of the reciprocity of the over the air channel by the symmetry of the DL and UL RF circuit paths of the one or more relays to obtain the downlink Total Channel CSI using the estimated uplink Total Channel CSI that includes the effect of the relays.

2. The method in claim 1 wherein the relay has $N_{BF} \geq 2$ antennas for receiving signals from the BS or other relays in the downlink and transmitting signals in the uplink and has $N_{UF} \geq 2$ antennas for transmitting signals in the downlink and receiving signals from the UEs and/or other relays in the uplink.

3. The method in claim 1 further comprising that using adjustable components such as attenuators and/or phase shifters in the DL and UL paths, by an relay, to make the circuit response of the DL path and the circuit response of the UL path the same or approximately the same to achieve the symmetry of the DL and UL paths.

4. The method in claim 3 further comprising adjusting the parameters of the adjustable components according to a measurement signal transmitted and received by the relay in a special reserved time slot.

5. The method in claim 1 further comprising an active interference cancellation block to enhance the isolation between a pair of receiving and transmitting antennas.

6. The method in claim 5 wherein the active interference cancellation block includes a circuit for estimating the over the air channel between a pair of transmitting and receiving antennas and using the estimated channel and a sampling of the transmitted signal to generate a cancelation signal.

7. The method in claim 6 wherein the circuit of the active interference cancellation block includes one or more of attenuator, phase shifter, Analog-to-Digital Converter (ADC), down-conversion, and signal generator.

8. The method in claim 7 further comprising adjusting the parameters of the attenuators and phase shifters according to a measurement signals transmitted and received by the relay in a special reserved time slot for tuning the circuit of the active interference cancellation block.

9. The method in claim 1 wherein the DL path and UL path shares the same amplify-and-forward path, switches to change the direction of signal transmission, and a control signal processing block.

10. The method in claim 9 wherein the control signal processing block generates control signals to change the connections of the switches.

11. The method in claim 10 wherein the control signal processing block detects and decodes the message about the DL and UL transmission indication and generates corresponding control signals to change the connections of the switches.

12. The method in claim 10 wherein the control signal processing block detects the signal power strength to decide the DL and UL transmission mode and generates corresponding control signals to change the connections of the switches.

13. The method in claim 12 wherein the power detection and switching control is completed in a short period of time not affecting the signal detection at the receiver.

14. The method in claim 13 wherein the short period of time is within a fraction of the Cyclic Prefix (CP) in an OFDM symbol.

15. A relay to enhance a MIMO wireless communication system comprising one or more pairs of a DL circuit path and an UL circuit path to amplify and forward two or more spatial multiplexed streams between a BS with a plural of antennas and two or more antennas on UEs wherein each UE has a sufficient number of antennas to receive and/or transmit the spatial multiplexed streams intended for it, and each path containing one or more adjustable circuit components;
 a measurement signal generator that transmits a measurement signal and a receiver that receives the measurement signal and measures the circuit response of the DL and UL circuit paths of the relay, and,
 a control circuit that generates the adjustment needed and changes the settings of the one or more adjustable circuit components to bring the circuit response of the DL and UL circuit paths of the relay to be the same or approximately the same;
 wherein the relay further comprises having $N_{BF} \geq 2$ antennas for receiving signals from the BS or other relays in the downlink and transmitting signals in the uplink and has $N_{UF} \geq 2$ antennas for transmitting signals in the downlink and receiving signals from the UEs and/or other relays in the uplink.

16. A relay to enhance a TDD MIMO wireless communication system comprising
 one or more amplify-and-forward paths to amplify and forward two or more spatial multiplexed streams between a BS with a plural of antennas and two or more antennas on UEs wherein each UE has a sufficient number of antennas to receive and/or transmit the spatial multiplexed streams intended for it;
 symmetric traces and switches to switch the one or more amplify-and-forward circuit paths of the relay to the DL direction when the BS is sending DL signal and to the UL direction when the BS is receiving UL signal such that the circuit responses in the two switched directions are the same or approximately the same; and
 a control circuit that detects the wireless signal direction using the RF signal it receives and switches the one or more amplify-and-forward circuit paths of the relay to match the direction of the direction of the wireless signals in the TDD MIMO wireless communication system.

17. The relay in claim 16 wherein the control circuit detects and decodes the message about the DL and UL transmission indication and generates corresponding control signals to change the one or more amplify-and-forward paths to match the direction of the direction of the wireless signals in the TDD MIMO wireless communication system.

18. The method in claim 16 wherein the control circuits detects the signal power strength to decide the DL and UL transmission mode, generates corresponding control signals to change the one or more amplify-and-forward paths to match the direction of the direction of the wireless signals in the TDD MIMO wireless communication system, and completes the change in a short period of time not affecting the signal detection at the receiver.

* * * * *